United States Patent [19]

Miyadera

[11] Patent Number: 5,758,220
[45] Date of Patent: May 26, 1998

[54] CAMERA

[75] Inventor: Shunichi Miyadera, Tokyo, Japan

[73] Assignee: Asahi Kogaku Kogyo Kabushiki Kaisha, Tokyo, Japan

[21] Appl. No.: 751,749

[22] Filed: Nov. 26, 1996

[30] Foreign Application Priority Data

Nov. 27, 1995 [JP] Japan .................................. 7-307092

[51] Int. Cl.$^6$ .................................................. G03B 17/02
[52] U.S. Cl. ............................................ 396/536; 396/315
[58] Field of Search .................................... 396/310, 311, 396/315, 535, 536

[56] References Cited

U.S. PATENT DOCUMENTS

| | | | |
|---|---|---|---|
| 4,894,671 | 1/1990 | Wheeler | 396/316 |
| 5,075,705 | 12/1991 | Harvey | 396/315 |
| 5,276,470 | 1/1994 | Fridman | 396/317 |
| 5,619,738 | 4/1997 | Petruchik et al. | 396/311 |

*Primary Examiner*—David M. Gray
*Attorney, Agent, or Firm*—Greenblum & Bernstein P.L.C.

[57] ABSTRACT

A camera uses a photo-sensitive film as a recording medium. A light source is provided to selectively illuminate a photographing frame on which a latent image has been formed with light so that evenly distributed light is superimposed on the latent image to delete the latent image.

17 Claims, 10 Drawing Sheets

CAMERA

BACKGROUND OF THE INVENTION

The present invention relates to a camera using a photo-sensitive film such as a silver halide film as a recording medium, and further provided with an LCD (liquid crystal display) as a monitor device.

A still camera using a photosensitive film, and provided with an LCD monitor is known. For example, in a camera using 35 mm roll film, a CCD (Charge Coupled Device) is provided as a part of an optical system, an image processing circuit is provided inside the camera, and the LCD panel is provided on the back cover of the camera. The CCD captures an image of an object and outputs an image signal. The image signal is processed by the image processing circuit, and then the processed image signal is transmitted to the LCD (Liquid Crystal Display) panel. With such a camera, it is possible to display an image on the LCD similar to that photographed on the film.

With the use of the LCD panel, a user can monitor the photographed image, check a camera angle, and the like, and avoid erroneous photographing.

As described above, if a camera using a photo-sensitive film as a recording medium is provided with an LCD monitor, the user can confirm the image exposed onto the film, similar to an electronic still video camera. Electronic still video cameras, however, use a memory as a recording medium, and therefore, the captured images can be deleted and recapturing of images can be executed. Conversely, with a camera using a photo-sensitive film, the image is permanently recorded on the film.

However, even with a camera using photo-sensitive film, a user may wish to delete an image recorded on the film.

Conventionally, in order to delete an image (a latent image) recorded on a photo-sensitive film, the film is exposed (over-exposed) to light at a photofinishing laboratory or the like before developing. However, it is difficult to identify the frame to be over-exposed to light (i.e., deleted), and the wrong frame may be exposed to light. In such a case, an important image may be deleted instead of the image intended to be deleted. Further, once the film is ejected from the camera, it may be lost or mistaken for another film. If the film is lost or mistaken, a wrong film may be exposed to the light at the laboratory, and the images recorded on the film deleted, but the image intended to be deleted may be mistakenly developed and seen by a second party.

SUMMARY OF THE INVENTION

It is therefore an object of the invention to provide an improved camera using a photo-sensitive film as a recording medium, for which an image recorded on the film can be deleted easily. In order to accomplish this object, according to one aspect of the invention, there is provided a camera using a photo-sensitive film, the camera comprising: a photographing system for recording a latent image of an object on a predetermined frame area of the photo-sensitive film; and an illuminating system which, when energized, illuminates the predetermined frame area with light. According to the above, a frame of a film on which a latent image is formed is further exposed to light, the latent image previously formed can deleted.

The illuminating system may be arranged to illuminate the photo-sensitive film from a side opposite to a side from which light from the object is incident to the film. That is, the film is exposed to the light from the back side. This structure has an advantage in that the arrangement of the illuminating means is flexible.

Optionally, the camera further has an image capturing system which receives an object image and generates image data, the image data corresponding to the latent image formed on the photo-sensitive film, and a displaying device which displays an image based on the image data. Such a camera enables a user to confirm the image before it is deleted.

The displaying device may include a liquid crystal display device provided at back side of the camera body, corresponding to the predetermined frame area, and wherein the displaying device includes a back light system. The light source for the back light system may be used as a light source for the illuminating system. In this case, an extra light source is not necessary.

Optionally, the light source is luminous at relatively high brightness when used for the back light system, and at relatively low brightness when used for illuminating the predetermined frame of the photo-sensitive film. The light source can have less brightness when the latent image on the film is deleted. By switching the brightness of the light source, unnecessary power consumption can be avoided.

Further, the displaying device may have a light source and a light guide plate which diffuses the light emitted by the light source. With use of the light guide plate, an evenly distributed light is thrown to the film plane.

According to another aspect of the invention, there is provided a camera using a photo-sensitive film, the camera comprising: a light source, which is provided on a back side of the camera at a position behind the film loaded in the camera; and a shutter provided between the light source and the film to open and close a light path therebetween, wherein when the shutter is opened, the film, to which a latent image of an object has been formed, is exposed to light emitted by the light source.

Optionally, the camera may be provided with an LCD (liquid crystal display) device for displaying an image corresponding to a photographed image.

According to a further aspect of the invention, there is provided a camera using a photo-sensitive film, the camera comprising an LCD (liquid crystal display) device for displaying an image corresponding to a photographed image, the LCD device being provided on a back side of the camera at a position behind the film loaded in the camera, the camera further comprising: a back light, which is provided between the LCD device and the film; and a shutter provided between the back light and the film to open and close a light path therebetween, wherein when the shutter is opened the film, to which a latent image of an object has been formed, is exposed to light emitted by the back light.

According to a still further aspect of the invention, there is provided a camera using a photo-sensitive film, a plurality of photographing frames being defined on the film, the camera comprises: a frame designating member to be operated to designate one of the plurality of photographing frames; a frame selecting member to be operated to determine whether the frame designated by the frame designating member is to be deleted; a film driving system which positions the frame determined to be deleted at a predetermined position; and an illuminating system which illuminates the frame positioned at the predetermined position with light.

The camera may be further provided with an image capturing system which receives an object image and generates image data, the image data corresponding to a latent image formed on a frame of the photo-sensitive film; a memory which stores the image data; a displaying device which displays an image based on the image data; and a display controller which read an image data corresponding to the frame designated by the frame designating member. With this camera, the user can identify the image to be deleted even if relatively long time has passed since the image was photographed.

Further, the displaying device may have a liquid crystal display (LCD) and a back light system provided at a back side of the camera, at a position corresponding to an area where the film is exposed to light from an object, an opening being formed on the back side of the camera for allowing the back light system to illuminate the frame, and wherein a shutter system for opening and closing light path from the back light system to the film is provided between the back light system and the film.

Furthermore, the back light system may illuminate the film at relatively low brightness, and illuminate the liquid crystal display at relatively high brightness.

Still further, the back light system may include a light source and a light guide plate which diffuses the light emitted by the light source to be diffused light which has evenly distributed brightness over a surface of the light guide plate.

Such a camera may further include a controller which first stores information indicating whether each of the photographing frames is to be deleted, and then controls the illuminating system to illuminate frames to be deleted based on the information.

In this case, when the controller controls the illuminating system to illuminate the frames to be deleted, the controller controls the film driving system to rewind the film to position a frame to be deleted at the predetermined position.

According to a still further aspect of the invention, there is provided a camera using a photo-sensitive film, comprising: a photographing means for forming a latent image on the film; and a superimposing means for superimposing a predetermined image on the latent image.

DESCRIPTION OF THE EMBODIMENT

Figure 1:
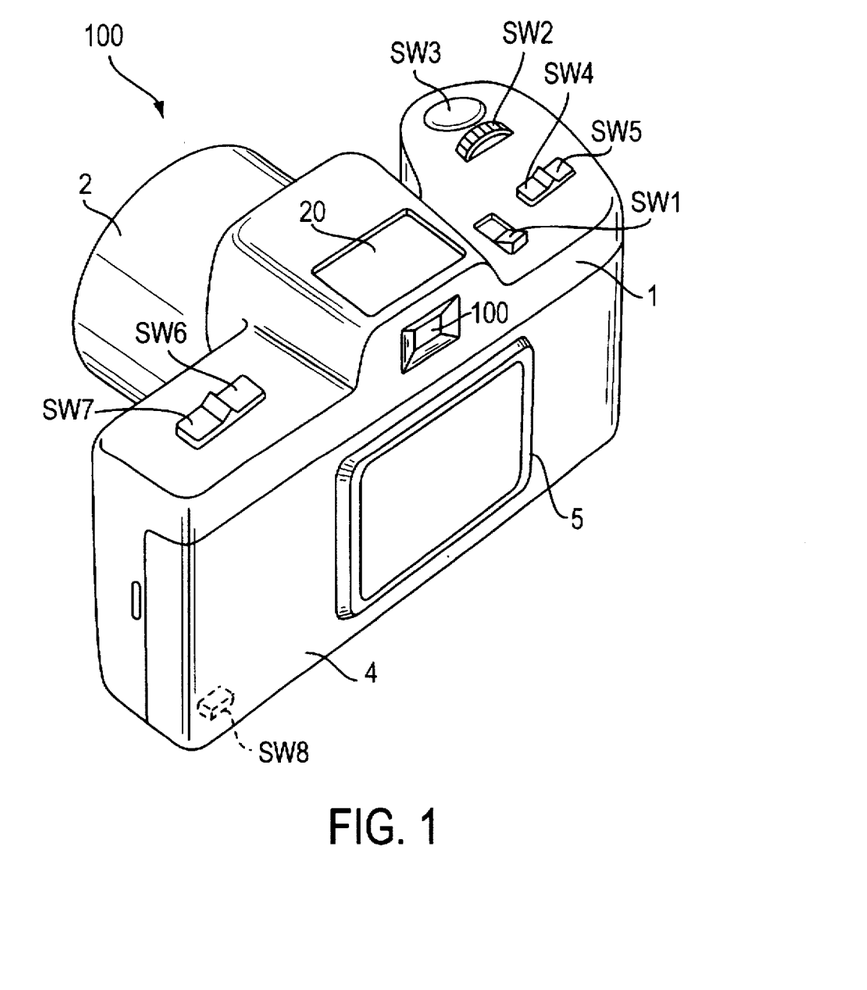
FIG. 1 is a perspective view showing an appearance of a single lens reflex camera embodying the present invention.
Figure 2:
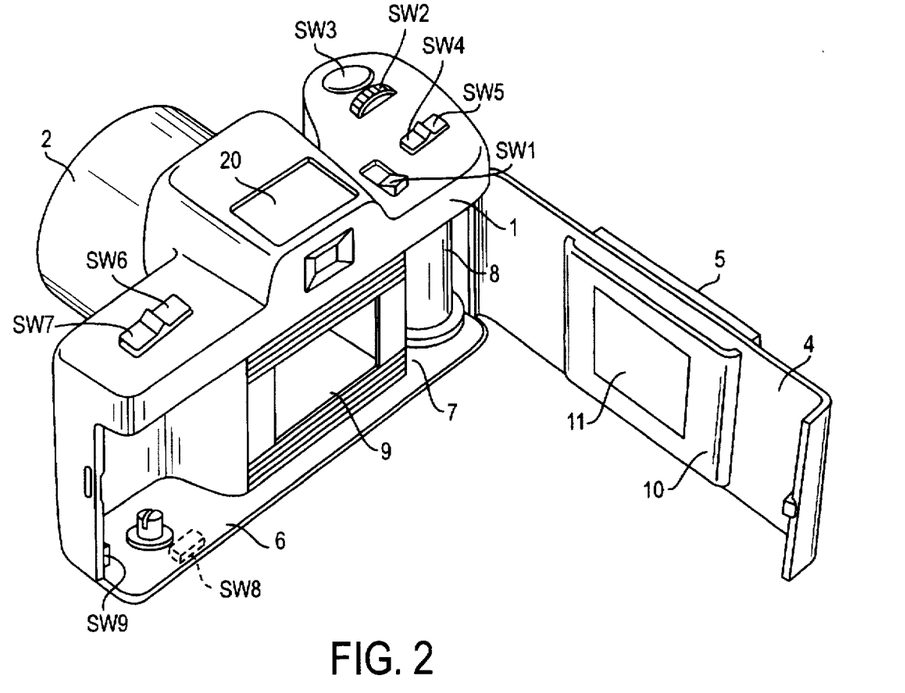
FIG. 2 is a perspective view of the camera 100 with a back cover open.

FIG. 1 a perspective view showing an appearance of a single lens reflex camera 100 embodying the present invention, and FIG. 2 is a perspective view of the camera 100 with a back cover being opened.

The camera 100 uses a silver halide 35 mm roll film (hereinafter, referred to as a film), which is a well-known and widely used photo-sensitive film.

The camera 100 has a photographing lens 2 on a front side thereof. On the upper portion of the back surface of the camera 100, a finder 3 is provided. On the upper side of the camera body, an LCD panel 20 is provided. The LCD panel 20 is used for displaying various information, such as a photographing parameters, the number of frames, and the like.

On the back side of the camera body 1, an openable back cover 4 is provided. On the outer surface of the back cover 4, an LCD monitor 5 is provided.

On an upper surface of the camera body 1, a main switch SW1, a mode selection switch SW2, a release switch SW3, an up switch SW4, a down switch SW5, a delete switch SW6, and a deletion start switch SW7 are provided. On the bottom surface of the camera body, a rewind switch SW8 is provided. As shown in FIG. 2, a back cover detection switch SW9 is provided inside the camera body 1 to detect open/close condition of the back cover 4.

The main switch SW1 is for turning ON and OFF the camera 100. The mode selection switch SW2 is used for selecting an operation mode of the camera 100. The release switch SW3 is a switch to be operated when the image is photographed (i.e., the film is exposed to image).

The up switch SW4, the down switch SW5, the delete switch SW6, and the delete start switch SW7 will be described later.

The rewind switch is used for forcibly rewinding the roll film.

As shown in FIG. 2, inside the camera body, a film cartridge chamber 6 and a spool chamber 7 are formed. In the film cartridge chamber 6, a cartridge of the 35 mm film is placed, and the end of the film (ejected from the film cartridge) is wound around the spool 8 at the spool chamber 7. Then, the film is fed as the spool 8 rotates.

Between the film cartridge chamber 6 and the spool chamber 7, a frame aperture 9, defining the photographing frame on the film, is formed. The size of the frame aperture is 24×36 mm. An object image is formed, through the frame aperture 9, by the photographing lens 2 on the film surface, and a latent image is formed on the film.

Inside the back cover 4, a pressure plate 10 is resiliently supported. When the back cover 4 is closed, the pressure plate 10 faces the frame aperture 9, with the film located therebetween.

Specifically, the size of the pressure plate 10 is greater than the aperture 9, and on a surface of the pressure plate 10 facing the frame aperture 9, a window 10a is formed. The window 10a has substantially the same size as the aperture 9, and a transparent plate 11 such as a transparent resin plate is fitted in the window 10a. The surface of the transparent plate 11 facing the aperture, and the pressure plate 10, are substantially on the same plane. The position of the transparent plate 11 corresponds to the LCD monitor 5 provided on the outer surface of the back cover 4.

Figure 3:
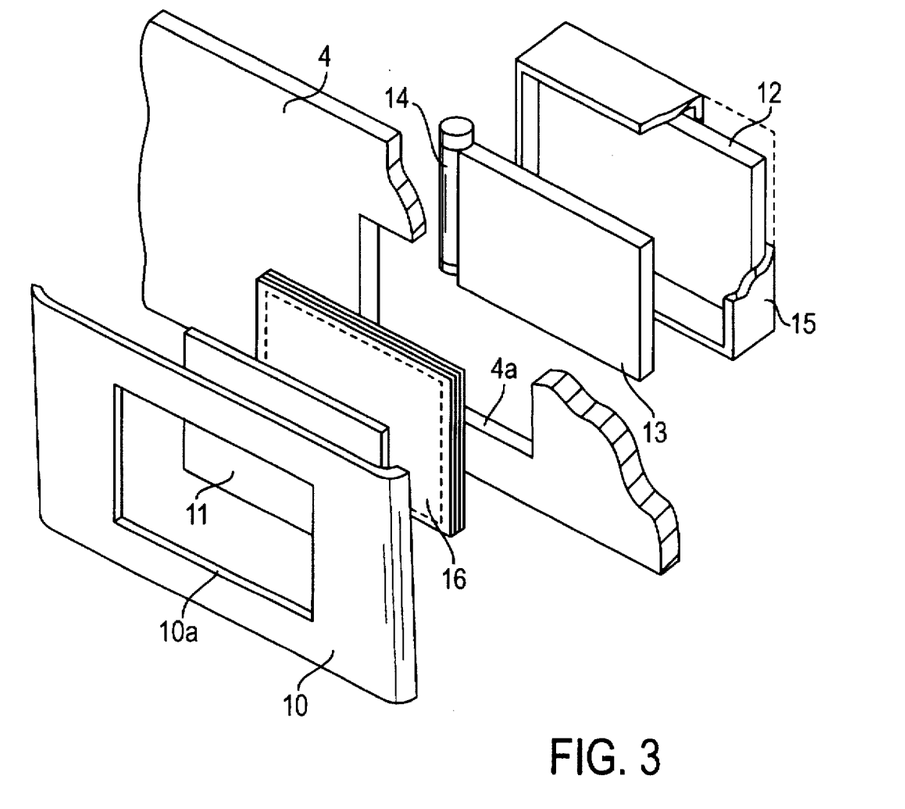
FIG. 3 is an exploded perspective view showing a structure of an LCD monitor and pressure plate.
Figure 4:
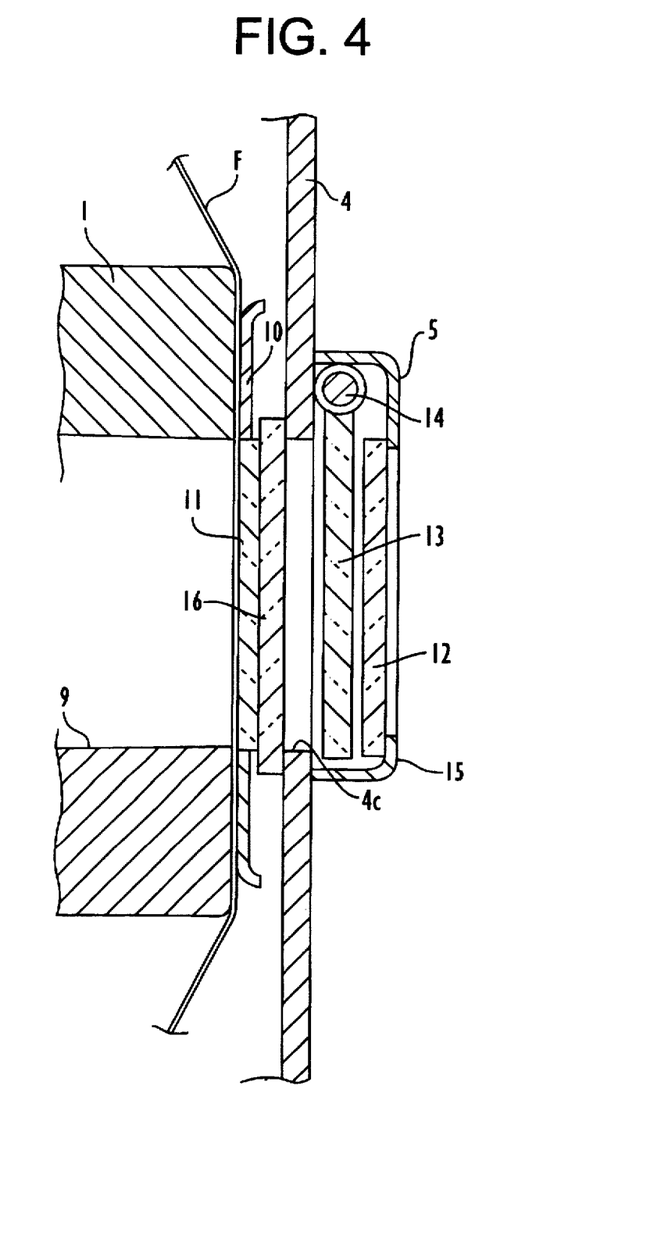
FIG. 4 is a cross sectional view of the LCD monitor 5 and the pressure plate.

FIG. 3 is an exploded perspective view showing a structure of the LCD monitor 5 and the pressure plate 10. FIG. 4 is a cross sectional view of the LCD monitor 5 and the pressure plate 10.

The LCD monitor 5 is a well-known LCD monitor, and has, for example, an LCD panel 12 having a plurality of pixel electrodes arranged in a matrix, a light guide plate 13 provided behind (i.e., on the inner side of the camera body 1) the LCD panel 12, and a fluorescent lamp 14 provided at one side end of the light guide plate 13. The LCD panel 12, the light guide plate 13, and the fluorescent lamp 14 are fitted in a frame-like casing 15, and fixed to the outer surface of the back cover 4.

The light guide plate 13 functions (in association with the fluorescent lamp 14) as a back light which illuminates the LCD panel 12 from the behind. The fluorescent lamp 14 is supplied with a high or low voltage to be lit at high or low brightness. When the LCD panel 12 is to be illuminated, the fluorescent lamp 14 is energized to emit light having high brightness, and when the multiple exposure with use of the back light system is completed, the fluorescent lamp 14 is energized to emit light having low brightness.

On the back cover 4, at the position corresponding to the LCD panel 12, a rectangular window 4a is formed. Inside the back cover 4, facing the window 4a, a delete shutter 16 is provided. The delete shutter 16 is, as controlled, capable of allowing light from the light guide plate 14 to pass through, or capable of shielding the same.

The delete shutter 16 is, for example, an LCD shutter which has a pair of plane electrodes and a liquid crystal sandwiched therebetween. Depending on the signal applied across the plane electrodes, the transparency of the LCD shutter changes, and the light is selectively allowed to pass therethrough or blocked.

The delete shutter 16 faces the transparent plate 11 provided on the pressure plate 10, and the size of the delete shutter 16 is at least greater than the size of the transparent plate 11 both in the horizontal and a vertical directions.

Accordingly, when the delete shutter 16 is in a closed state (light shielding state), light emitted from the light guide plate 14 does not pass through the delete shutter 16, and therefore does not reach a film F (see FIG. 4).

Conversely, when the delete shutter is in an open state, light emitted from the light guide plate 13 passes through the transparent plate 11 fitted in the window 10a and through the delete shutter 16, thereby exposing the film F to the light from the back side. As the film F is exposed to the light from the light guide 13, the latent image of an object recorded on the film F is deleted.

Figure 5:
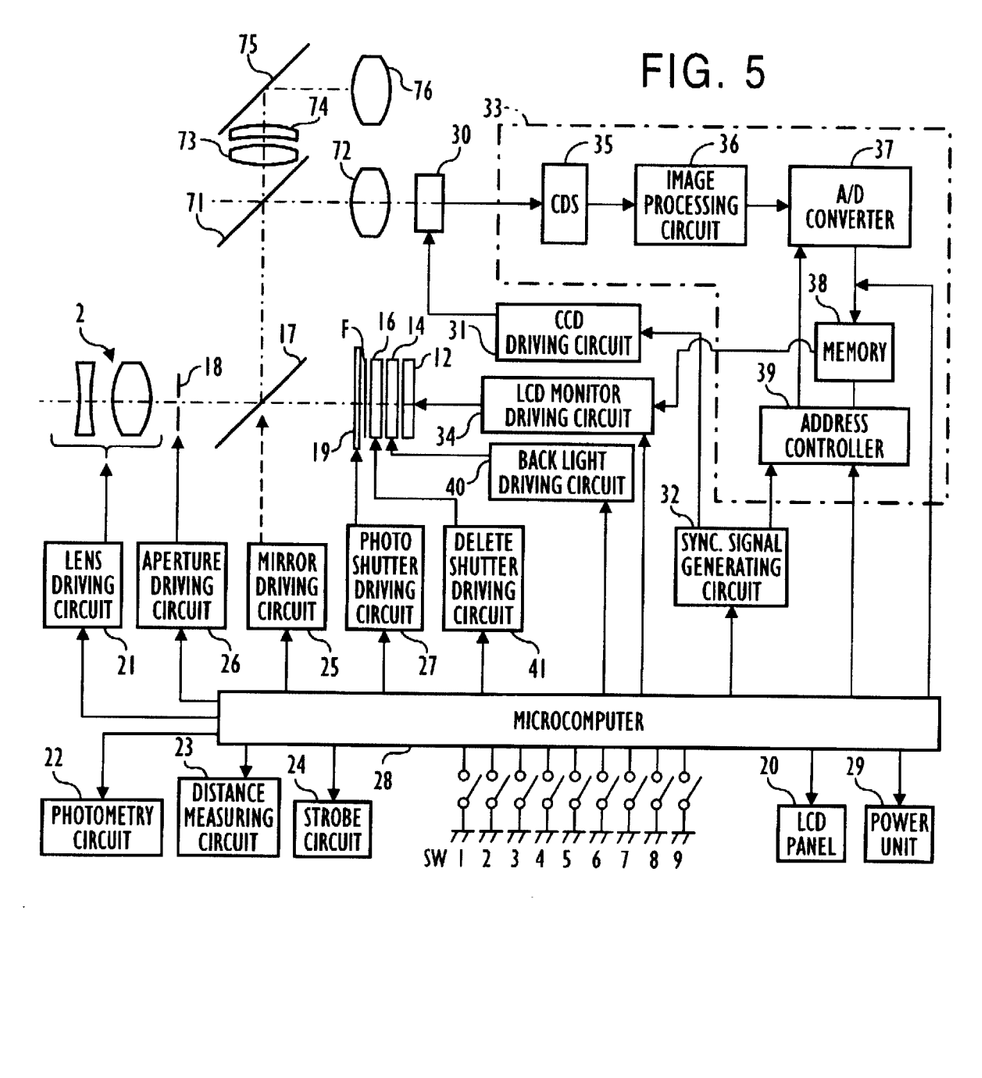
FIG. 5 shows a block diagram of the camera.

FIG. 5 shows a block diagram of the camera 100.

As shown in FIG. 5, the camera 100 has:

a lens driving circuit 21 for driving the photographing lens to perform zooming and focusing operations;

a photometry circuit 22 to be used for detecting the brightness of the object;

a focus detecting circuit 23 for determining a defocus amount;

a strobe circuit 24;

a quick return mirror 17, and a quick return mirror driving circuit 25, which drives the quick return mirror 17 to retract from the light path between the photographing lens 2 and the frame aperture 9;

an aperture driving circuit 26 which varies the size of the aperture 18;

a photographing shutter driving circuit 27, which drives the shutter mechanism to execute a photographing operation.

The above circuits are all controlled by a microcomputer 28. The photographing operation by the camera 100 is similar to conventional cameras, and will not be described in detail.

To the microcomputer 28, the above-described display unit 20, a power unit 29, the switches SW1–SW9 are connected.

The up switch SW4 and the down switch SW5 are used for selecting a frame to be deleted, and are described in detail below.

The delete switch SW6 is used for executing the overexposure of a frame of the film F using the light emitted by the light guide 13, at a frame currently located at the position facing the pressure plate 10.

The delete start switch SW7 is a switch for starting the delete operation of the latent image recorded on the subject frame film F.

The up switch SW4 and the down switch SW5 are turned ON by operating a single operable member in opposite directions.

The delete switch SW6 and the delete start switch SW7 have the similar structure, i.e., an operated direction of a single operable member determines turning ON of one of the switches SW6 and SW7.

The camera 100 has a CCD image capturing device 30, which is arranged to receive a part of light passed through the photographing lens. The CCD image capturing device 30 is driven by a CCD driving circuit 31, which drives the CCD image capturing device 30 synchronously with the synchronizing signal transmitted from a synchronizing signal generating circuit 32 connected to the microcomputer 28.

The CCD image captures device 30 capture an image which has been photographed, or is intended to be photographed, and outputs an image signal. The image signal is processed by the image processing unit 33.

The image processing unit 33 includes, a CDS (Correlated Double Sampling) circuit 35, an image signal processing circuit 36, an A/D (analog to digital) converter 37, an image data memory 38, and an address controller 39. The image signal transmitted from the CCD image capturing device 30 is processed by the CDS circuit 35 and image signal processing circuit 36, and is then converted into a digital image signal by the A/D converter 37. The converted digital image signal is stored in the memory 38 as image data.

The fluorescent lamp 14 is selectively turned OFF, lit at lower brightness, or lit at high brightness, under the control of a back light driving circuit 40.

Opening/closing operations of the delete shutter 16 are controlled by a delete shutter driving circuit 41.

Light from an object is passed through the photographing lens 2, and is reflected by the quick return mirror 17 before photographing is executed. When photographing is executed, the quick return mirror 17 is moved upwardly from the position shown in FIG. 5 so that the light path from the photographing lens to the film F is opened.

When photographing is executed, the light passed through the photographing lens 2 and the aperture 18 is directed to the shutter 19. When the shutter 19 is opened, the object image is projected onto the film F, and a latent image of the object is formed on the film F. After a predetermined exposure period has passed, the shutter 19 closes, and the quick return mirror 17 returns to the position shown in FIG. 5. Thereafter, if a user intends to delete the latent image formed on the film F, the fluorescent lamp 14 is lit at the low brightness and the delete shutter 16 is opened. Then, the portion (i.e., the frame) having the undesired latent image is exposed to light from the back side (right-hand side of the film F in FIG. 5). As the light from the back side of the film F is diffused by the light guide plate 13, substantially evenly distributed light is incident on the film F, and the latent image is deleted. In other words, an image of the substantially evenly distributed light is superimposed on the frame where the latent image has been formed, and the latent image of the object disappears.

The light reflected by the quick return mirror 17 is separated into two components. One component is reflected by a half mirror 71 and directed to a relay lens 72. The component passed through the relay lens 72 is incident onto the light receiving surface of the CCD 30. Accordingly, the object image is captured by the CCD 30, and an image signal corresponding to the object image can be obtained. The second component is passed through the half mirror 71, and is incident to another relay lens 73 and a condenser lens 74. The second light component passed through the relay lens 73 and the condenser lens 74 is reflected by a mirror 75, and directed to an eyepiece lens of the finder 3. As above, the light passed through the photographing lens 2 is used for forming the latent image of the object, for obtaining the image signal of the object, and for viewing the object through the finder 3.

Figure 6:
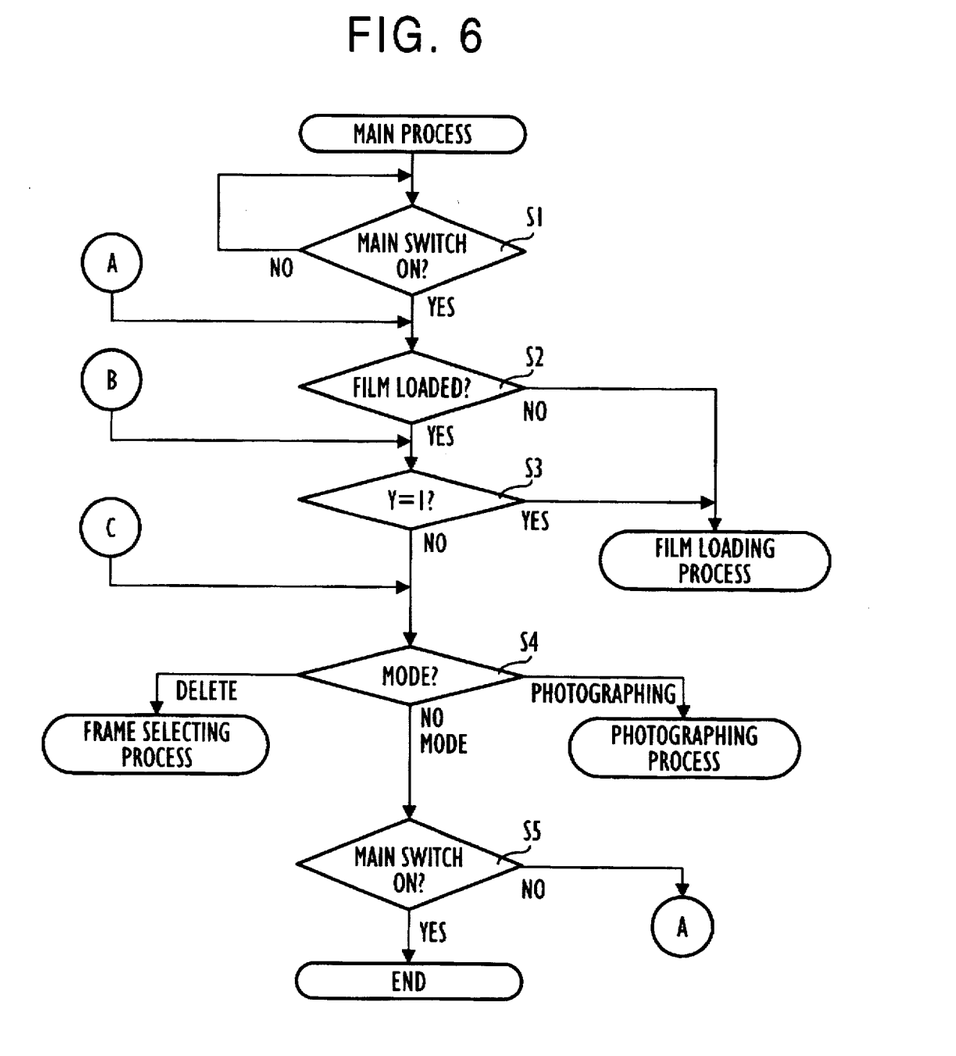
FIG. 6 shows a flowchart for a main process executed by the microcomputer.

FIG. 6 shows a flowchart for a main process executed by the microcomputer 28.

Figure 7:
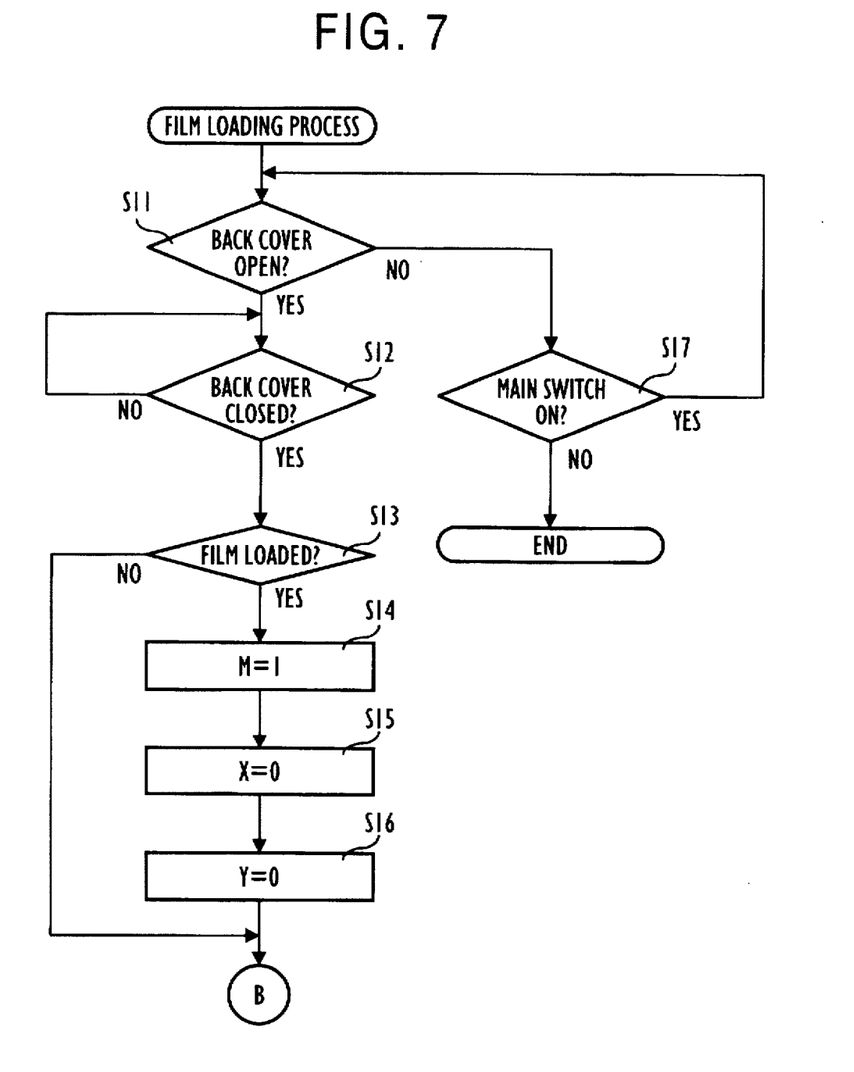
FIG. 7 shows a flowchart illustrating the film loading process.

At Step S1, the microcomputer 28 determines whether the main switch SW1 is turned ON or OFF. If the main switch SW1 is in the OFF state, the control repeats the determination at S1 until the main switch SW1 is turned ON. If the main switch SW1 is turned ON (S1:YES), control proceeds to Step S2 where it is determined whether the film F is loaded with use of a detector (not shown) provided in the camera 100. If the film F is not loaded (S2:NO), control proceeds to a film loading process which is shown in FIG. 7.

If the film F has been loaded (S2: YES), then the microcomputer 28 determines whether the film F has been rewound or wound at least by one frame at step S3. The determination of the film winding status is made with reference to a flag Y. When the film F has been rewound, Y is set to 1, while when the film F is still wound at least by one frame, Y is set to 0.

If the film F has been rewound (S3:YES; Y=1), control goes to the film loading process shown in FIG. 7. If the film F is wound by at least one frame (S3:NO; Y=0), control goes to step S4, where the microcomputer 28 determines whether a photographing mode or a delete mode is selected. If either mode is not selected, control goes to step S5 where the status of the main switch is detected. If the main switch SW1 is OFF (S5:NO), the main process is terminated. If the main switch SW1 is ON (S5:YES), the control returns to S2, and above described steps are executed.

Figure 8:
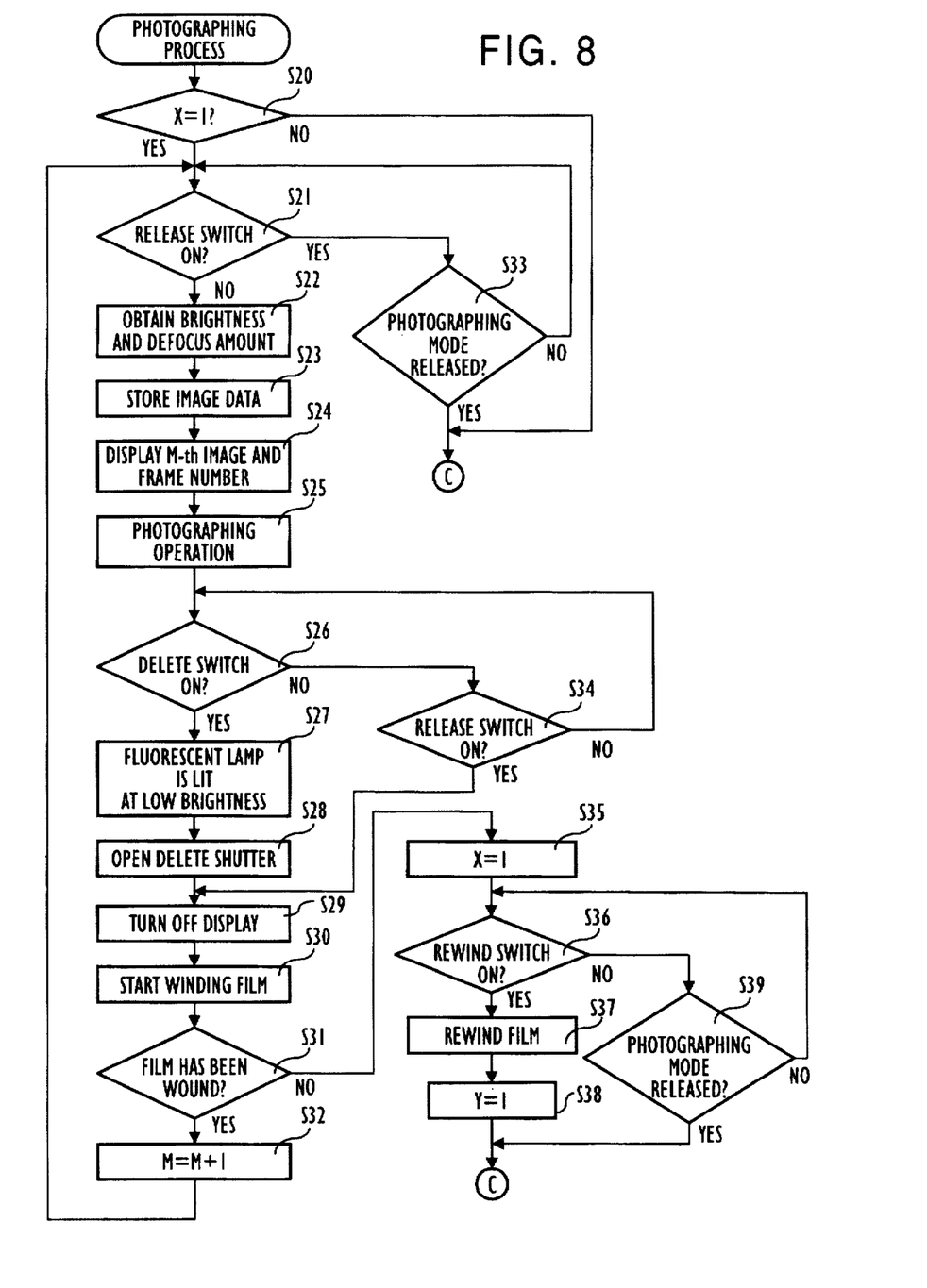
FIG. 8 shows a flowchart illustrating the photographing process.

If it is detected that the photographing mode is selected at Step S4, control goes to a photographing process shown in FIG. 8. If the delete mode is selected at Step S4, control goes to a frame selecting process shown in FIG. 9.

In the embodiment, only two operation modes are available. However, the operation modes are not necessarily limited to these two modes, and various alternative and/or additional modes could be employed.

FIG. 7 shows a flowchart illustrating the film loading process. In the film loading process, the microcomputer 28 determines whether the back cover 4 is open based on the status of the detection switch SW9 at Step S11. If the back cover 4 is closed (S11:NO), the microcomputer 28 determines whether the main switch SW1 is turned ON at Step S17. If the main switch SW1 is turned OFF (S17:NO), the film loading process is terminated. If the main switch SW1 is turned ON (S17:YES), control returns to Step S11.

If the back cover 4 is open (S11:YES), then control goes to Step S12, where the microcomputer 28 determines whether the back cover 4 is closed. Until the back cover 4 is closes, control stays at step S12. When the back cover 4 is closed (i.e., the back cover 4 is once opened and then closed), the determination at Step S12 turns YES, and control proceeds to step S13. At step S13, the microcomputer 28 determines whether the film is loaded in the camera 100. If the film F is not loaded (S13:NO), then control goes to Step S3 of the main process shown in FIG. 6.

If the film F is loaded (S13:YES), the microcomputer executes steps S14 through S16, where M is set to 1 (Step S14), X is set to 0 (Step S15) and Y is set to 0 (Step S16). M represents a value which is the frame number of the next frame to be exposed. X is a flag, and when frames not yet photographed remain on the film F, X is set to 0, but if no frames remain on the film F (i.e., all the frames on the film F have been used for photographing), X is set to 1. As described before, Y is a flag representing whether the film F has been rewound (Y=1) or is still wound by at least one frame (Y=0). After steps S14 through S16 are executed, control goes to Step S3 of the main process shown in FIG. 6.

FIG. 8 shows a flowchart illustrating the photographing process. In the photographing process, the microcomputer 28 first determines whether X equals 0 or 1 (S20). If X equals 1 (S20:YES), i.e., if no more frames are available, control goes to Step S4 of the main process shown in FIG. 6. If X equals 0 (S20:NO), i.e., some frames remain exposed and it is possible to photograph, control goes to Step S21, where the microcomputer 28 determines whether the release switch SW3 is turned ON. If the release switch SW3 is not turned ON (S21:NO), step S33 determines whether the operation mode is the photographing mode. If the photographing mode is released (S33:YES), control goes to step S4 of the main process. If the operation mode is the photographing mode (S33:NO), then control returns to Step S21, and until the release switch SW3 is turned ON, the above steps are repeatedly executed.

If the release switch SW3 is turned ON when the photographing process is performed (S21:YES), then control proceeds to Step S22.

At Step S22, the microcomputer 28 detects the brightness of the object with use of the photometry circuit 22, and determines the defocus amount based on the data obtained by the focus detecting circuit 23. Further, at Step S22, the microcomputer 28 controls the aperture driving circuit 26 and lens driving circuit 21 to set the aperture 18, and to move the lens 2 to an in-focus position based on a photometry data output by the photometry circuit 22 and on the defocus amount output by the focus detecting circuit 23 (Step S22).

At Step S23, the CCD driving circuit 31 controls the CCD image capturing device 30 to capture an image of the object, and the image data is stored in the memory 38 as an M-th frame. Note that the initial value of the variable M is set at Step S14 of the film loading process shown in FIG. 7. At Step S24, the image—as stored—is displayed on the LCD monitor 5. When the M-th frame image is displayed on the LCD monitor 5, the fluorescent lamp 14 is supplied with a high voltage to be lit at high brightness, so that the LCD monitor 5 is illuminated by the back light. At the same time, on the LCD panel 20, the number of the variable M is displayed (step S24). Then, at step S25, the microcomputer 28 controls the mirror driving circuit 25 to flip up the quick return mirror 17, controls the photographing shutter driving circuit 27 to open the shutter 19 to carry out the photographing operation (Step S25). The microcomputer 18 further controls, at the same time, the strobe circuit 24 to emit a strobe light if necessary.

After photographing of a frame is completed as described above, it becomes possible to delete the photographed frame of the film F.

In order to delete the frame which has just been photographed, the delete switch SW6 is to be operated. At Step S26, the microcomputer 28 determines whether the delete switch SW6 is in an ON state or not. If the delete switch SW6 is not operated (S26:NO), the microcomputer 28 determines at Step S34 whether the release switch SW3 is turned ON. If the release switch SW3 is not operated (S34:NO), then control returns to Step S26.

If, at Step S26, the microcomputer 28 determines that the delete switch SW6 is operated (S26:YES), then the voltage applied to the fluorescent lamp 14 is lowered so that the fluorescent lamp 14 is lit at the low brightness (27). Then, at Step S28, the microcomputer 28 opens the deletion shutter 16 so that evenly distributed light is emitted from the light guide plate 13 to the film F through the transparent plate 11. Thus, the frame of the film F at which the latent image of the object is formed is further exposed to evenly distributed light, and the latent image of the object is thereby deleted. Note that the duration of the exposure of the film F to the light at S28 is sufficiently long so that the previously formed latent image of the object is completely deleted. If, at Step S26, the microcomputer 28 determines that the delete switch SW6 is not operated (S26:NO) and the release switch SW3 is operated (S34:YES), then control goes to Step S29, i.e., steps S27 and S28 are skipped.

Accordingly, after a photographing is executed, control waits for an operation of the delete switch SW6 or the release switch SW3. If the delete switch SW6 is operated, the frame is exposed to light from the light guide plate 13, and the frame image is thereby deleted. If the release switch SW3 is operated, then deletion of the image is not executed, and control proceeds to a next procedure.

At Step S29, the microcomputer 28 controls the LCD monitor driving circuit to stop displaying image on the LCD monitor 5, and simultaneously turns OFF the fluorescent lamp 14. Further, at Step S30, the microcomputer 28 controls a film driving motor (not shown) to wind the film F by one frame. The microcomputer 28 determines, at Step S31, whether the film F has been wound by one frame successfully. If the film F has been wound (S31:YES), the variable M representing the number of photographed frames is incremented (Step S32), and control returns to Step S21.

If the film winding operation at Step S30 fails, the microcomputer 28 determines, at Step S31, that the film F has not been wound (S31:NO), and then control goes to step S35. Since the failure of film winding occurs when the film F has been fed to the end, at Step S35, the flag X representing an absence or an existence of the frames is set to 1 (i.e., no frames remained). At this stage, since the film F has not yet rewound, the flag Y is still set to 0.

If the rewind switch SW8 is operated (S36:YES), the film F is rewound (Step S37), and the flag Y is set to 1, at Step S38, to indicate the film F has been rewound. Thereafter, controls goes to step S4 of the main process shown in FIG. 6. If the rewind switch SW8 is not turned ON (S36:NO), the microcomputer 28 determines whether the operation mode is changed from the photographing mode to another mode (Step S39). If the photographing mode is released (S39:YES), control goes to step S4 of the main process. If the operation mode stays the photographing mode (S39:NO), control returns to Step S36.

With the above-described camera, the latent images on the frames having been photographed can be selectively deleted. This feature is described hereinafter with reference to FIGS. 9 and 10.

Figure 9:
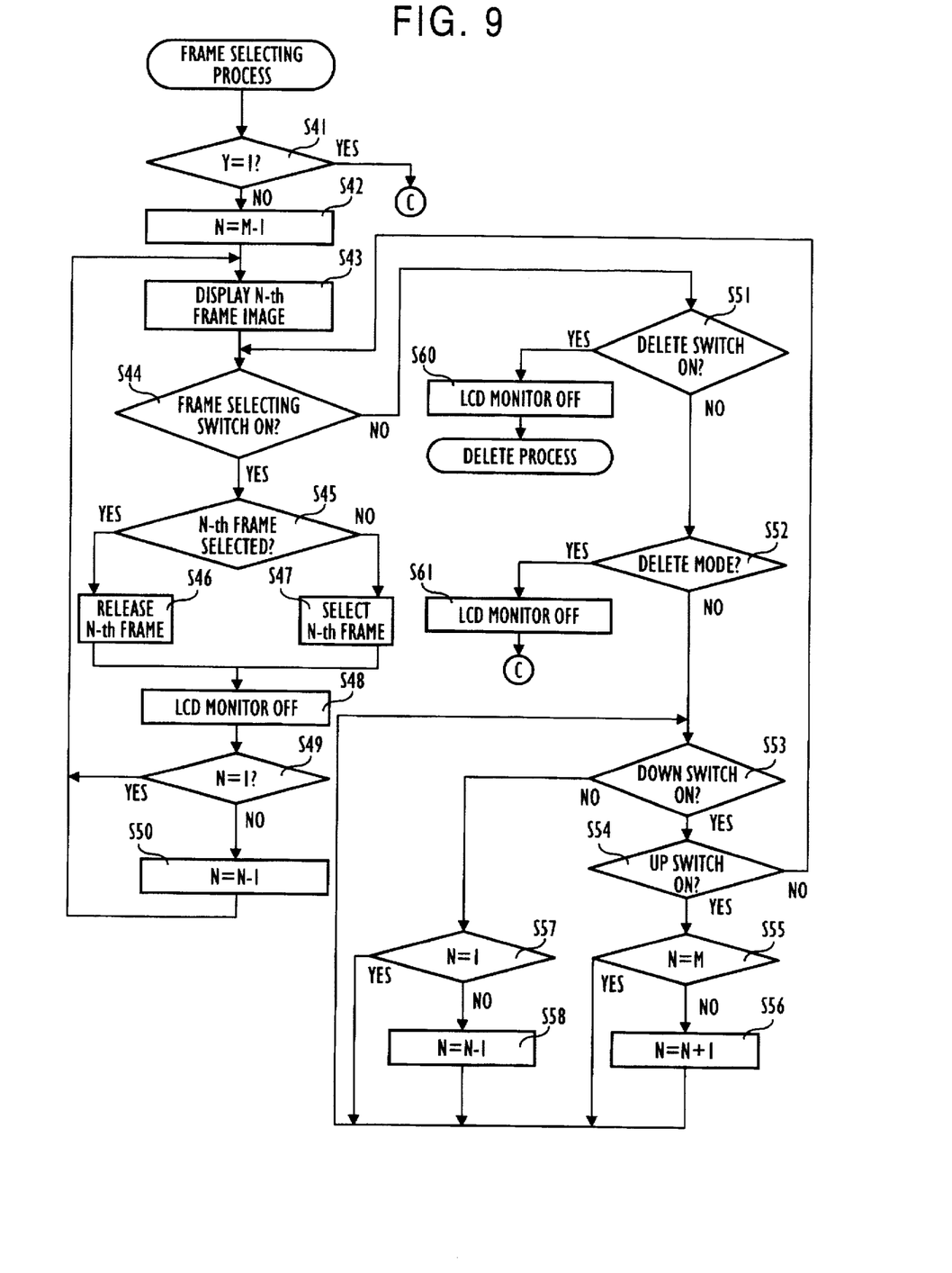
FIG. 9 shows a flowchart illustrating a frame selection process.

FIG. 9 shows a flowchart illustrating a frame selection process which is executed when the mode selection switch SW2 is switched to the delete mode. The microcomputer 28 determines if the delete mode is selected at Step S4 of the main process shown in FIG. 6. The frame selected in the frame selection process is subject to a frame deleting process (described later).

In FIG. 9, at Step S41, the microcomputer 28 determines whether the flag Y equals 1 or 0. If Y=1, i.e., if the film F has been rewound (S41:YES), deletion of the frames cannot be executed, and therefore control returns to Step S4 of the main process.

If Y=0, i.e., if the film F is in the camera 100 with the film F being loaded, the microcomputer 28 calculates the total number N of the frames having been photographed as N=M−1 (S42). Since the variable M represents the next frame number to be photographed, the total number N of frames obtained by subtracting 1 from M.

At Step S43, the microcomputer 28 reads the data for an N-th frame stored in the memory 38, and displays the image of the N-th frame on the LCD monitor 5. Simultaneously, the microcomputer 28 displays the numeral N and an indication that the N-th frame is to be deleted (also at Step S43). At this stage, if the user intends to delete the N-th frame image, the release switch SW3 is operated. If the user does not intend to delete the N-th frame image, but rather intends to select another frame, by operating the up switch SW4 and/or down switch SW5, the user can select another frame.

At Step S44, if the release switch (which also functions as a frame selecting switch) SW3 is ON, the microcomputer 38 further determines whether the N-th frame has already been selected as a frame to be deleted (S45). If the N-th frame has already been selected (S45:YES), the selection of the N-th image is released (Step S46). If the N-th frame has not yet been selected (S45:NO), the N-th frame is selected as a frame to be deleted. The value N and selection information (i.e., whether the frame is to be deleted or not) are stored in a delete information storing area of the RAM (Random Access Memory) built in the microcomputer 28 at S48. Note that in steps S44 to S47, a frame which has not yet been selected is selected, and as to the frame having been selected, the selection is released (i.e., deselected). That is, steps S44 to S47 carry out a toggle of selection status for the current frame.

At Step S49, the microcomputer 28 determines whether N is 1. If N=1, control returns to Step S43. Otherwise (i.e., N>1), N is decremented by one, and then control goes to Step S43. By repeatedly executing above steps, frames to be deleted can be selected sequentially from the latest frame to the first frame.

If the user does not want to delete the frame corresponding to the image displayed on the LCD monitor 5, i.e., if the selection of frames to be deleted is complete, the release switch (frame selecting switch) SW3 is not operated (S44:NO). In such a case, control goes to step S51 where the microcomputer 28 determines whether the delete switch SW6 is turned ON.

Figure 10:
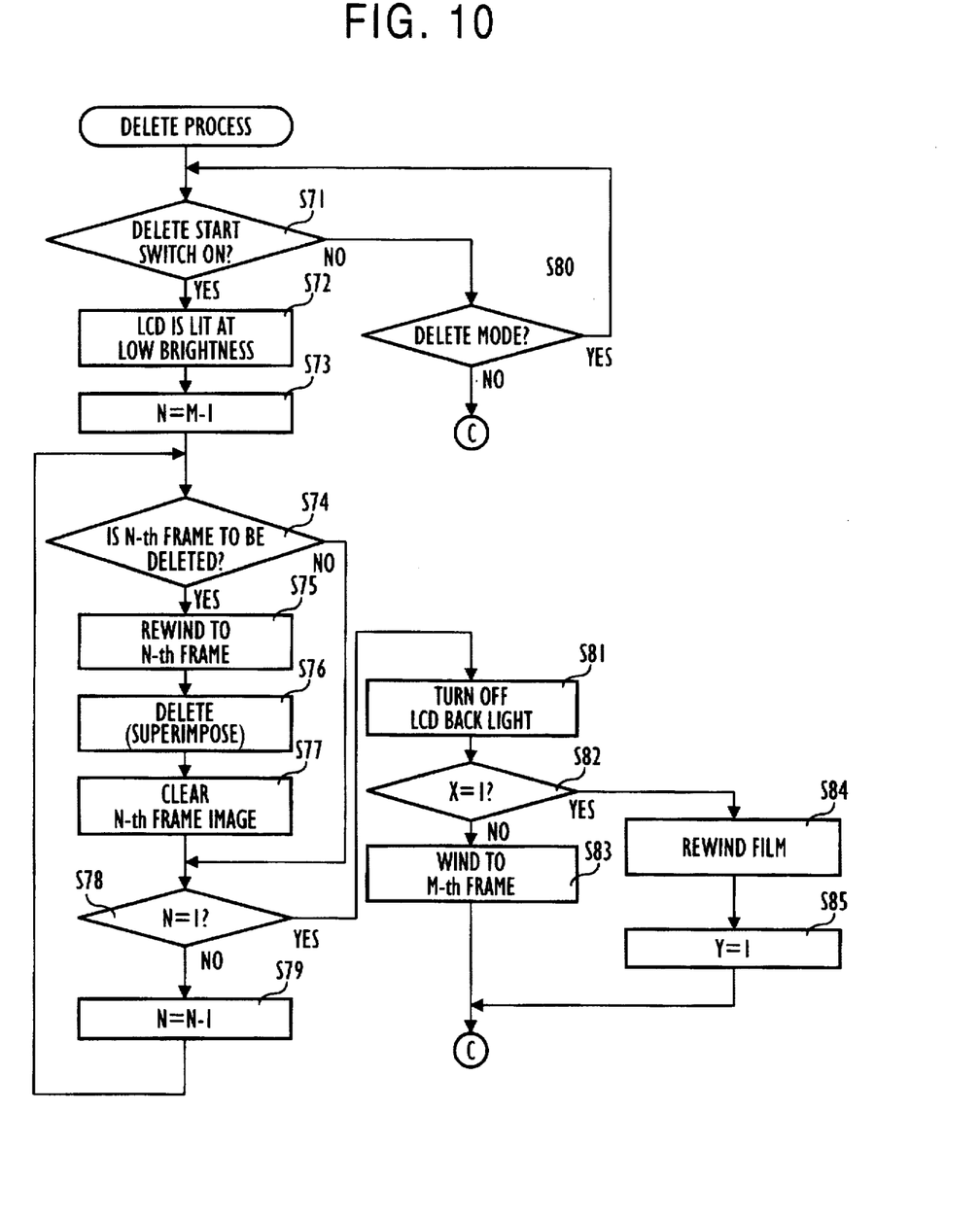
FIG. 10 shows a flowchart illustrating the frame delete process.

If the delete switch SW6 is turned ON (S51:YES), selection of the frames to be deleted is completed, and control goes to Step S60 where the LCD panel 20 is turned OFF, and control proceeds to a delete process shown in FIG. 10.

If the delete switch SW6 is OFF (S51:NO), the microcomputer 28 determines, at Step S52, whether the mode selection switch SW2 selects the delete mode. If the delete mode is not selected (S52:NO), the LCD panel 20 is turned OFF (Step S61), and control goes to Step S4 of the main process.

If the delete mode is selected (S52:YES), the statuses of the up switch SW4 and the down switch SW5 are detected, and operations according to the operation status of the up switch SW4 or the down switch SW5 are executed in steps S53 through S58.

At Step S53, the microcomputer 28 determines whether the down switch SW5 is turned ON. If the down switch SW5 is turned ON (S53:YES), N is decremented in response to the operation of the down switch SW5 (steps S53, S57 and S58) until N reaches 1. If N reaches 1 (S57:YES) or after N is decremented at Step S58, control returns to Step S53.

If the down switch SW5 is not ON, then the microcomputer 28 determines whether the up switch SW4 is ON (S54). If the up switch SW4 is ON (S54:YES), N is incremented by one (steps S55 and S56) until N equals M. If N becomes equal to M (S55:YES), or after N is incremented at Step S56, control goes back to Step S53.

If the up switch SW4 and the down switch SW5 are not operated (S53:NO; S54:NO), control goes to Step S44.

With the above procedure, a desired image frame and its frame number N can be displayed on the LCD monitor 5 and the LCD panel 20, respectively. Thus, the user can determine whether the frame is to be deleted or not with reference to the displayed image on the LCD monitor 5 and/or the frame number N displayed on the LCD panel 20.

FIG. 10 shows a flowchart illustrating the frame delete process which is executed after the frames to be deleted are selected in the frame selection process and the delete switch SW6 is operated.

At Step S71, the microcomputer 28 determines whether the delete start switch SW7 is turned ON. If the delete start switch SW7 is not turned ON (S71:NO), then the microcomputer 28 determines (step S80) whether the mode selection switch SW2 selects the delete mode or not. If the delete mode is not selected (S80:NO), control goes to Step S4 of the main process. If the microcomputer 28 determines that the delete start switch SW7 is ON (S71:YES), then the deletion of the selected frames starts.

Firstly, the fluorescent lamp 14 is lit at the low brightness (Step S72), and the frame number N is reset to M−1 at Step S73.

At Step S74, the microcomputer 28 determines whether the N-th frame is to be deleted based on the information stored in the RAM in the microcomputer 28. If the N-th frame is to be deleted (S74:YES), the film F is rewound so that the N-th frame is located in front of the pressure plate 10 (Step S75). Then, the delete shutter 16 is opened to introduce the light from the light guide plate 13 onto the back side of the film F at an area corresponding to the N-th frame (Step S76). In accordance with the deletion of the N-th image frame of the film F, the microcomputer 28 clears the image data (corresponding to the N-th frame) from the memory 38 (step S77).

At Step S78, the microcomputer 28 determines whether the frame number N equals 1. If N is not equal to one (S78:NO), there are frames remained to be dealt with, and control goes to step S79 where N is decremented by one. Then, the above described steps from step S74 are executed for the new frame number N. If N becomes equal to 1 (S78:YES), control goes to Step S81 where the fluorescent lamp 14 is turned OFF, since all the frames to be deleted have been exposed to light emitted from the light guide plate 13.

At Step S82, the microcomputer 28 determines whether X is equal to 1. If X is not equal to 1 (S82:NO), further frames available to be used for photographing, and therefore the microcomputer controls the film driving motor to feed the film F until the M-th frame is located at the pressure plate 10 (Step S83). Then, control goes to Step S4 of the main process.

If the flag X is not 1, i.e., the flag X equals 0 (S82:NO), then there are no further frames on the film F to be used for further photographing. Accordingly the microcomputer 28 controls the film driving motor to rewind the film F (Step S84). As the film is rewound, the flag Y is set to 1 (Step S85), then control goes to Step S4 of the main process.

As described above, according to the invention, the latent image recorded on the photo-sensitive film can be deleted. Deletion can be done not only immediately after the photographing is executed, but the previously shot frames can also be selectively deleted. Further, the frames to be deleted are displayed on a monitor, the user confirms the image to be deleted before the deletion is carried out. Further, once the deletion of the latent image is carried out, the image data stored in the memory is cleared.

Furthermore, since the back light of the LCD monitor is used for the light source when the photographed frame is exposed to further light, no extra light source is necessary. Still further, since an LCD shutter is used for the delete shutter, the delete shutter is made compact, which allows the camera to be made compact.

Although in the described embodiment, the back light of the LCD monitor is used as the light source for illuminating the film to delete the photographed frame, it is possible to use a separate light source for this purpose. Furthermore, the delete shutter is not limited to an LCD shutter, and any shutter, including a mechanical shutter can be applied.

The present disclosure relates to subject matter contained in Japanese Patent Application No. HEI 7-307092, filed on Nov. 27, 1995, which is expressly incorporated herein by reference in its entirety.

What is claimed is:

1. A camera using a photo-sensitive film, said camera comprising:

a photographing system for exposing a latent image of an object over a predetermined photographing frame area of said photo-sensitive film; and an illuminating system, separated from said photographing system so that illumination from said illuminating system does not pass through said photographing system, said illuminating system illuminating substantially all of said predetermined photographing frame area when energized.

2. The camera according to claim 1, wherein said illuminating means illuminates said photo-sensitive film from a side opposite to a side from which light from said object is incident to said film.

3. The camera according to claim 1, further comprising an image capturing system which receives an object image and generates image data, said image data corresponding to said latent image formed on said photo-sensitive film, and a displaying device which displays an image based on said image data.

4. The camera according to claim 3, wherein said displaying device comprises a liquid crystal display device provided on a back side of said camera body, at a position corresponding to said predetermined frame area, and wherein said displaying device includes a back light system, at least a light source for said back light system being used as a light source for said illuminating system.

5. The camera according to claim 4, wherein said light source emits light of a higher brightness when used for said back light system, and at a lower brightness when used for illuminating said predetermined frame of said photo-sensitive film.

6. The camera according to claim 5, wherein said displaying device further comprises a light guide plate which diffuses the light emitted by said light source.

7. The camera according to claim 1, wherein said illuminating system illuminates substantially all of said predetermined photographing frame area with substantially evenly distributed light when energized.

8. A camera using a photo-sensitive film, said camera comprising:

a light source, which is provided on a back side of said camera at a position behind said film loaded in said camera; and a shutter provided between said light source and said film that opens and closes a light path therebetween, wherein when said shutter is opened, said film, to which a latent image of an object has been formed, is exposed to light emitted by said light source.

9. The camera according to claim 8, wherein said camera has a liquid crystal display device for displaying an image corresponding to a photographed image.

10. A camera using a photo-sensitive film, a plurality of photographing frames being defined on said film, said camera comprising:

a manually operable frame designating member that designates one of said plurality of photographing frames;

a manually operable frame selecting member that determines whether said frame designated by said frame designating member is to be overexposed sufficiently to prevent subsequent exposure and development;

a film driving system that positions said frame determined to be overexposed at a predetermined position; and an illuminating system which illuminates and overexposes said frame, sufficiently to prevent subsequent exposure and development, at said predetermined position.

11. The camera according to claim 10, further comprising:

an image capturing system that receives an object image and generates image data, said image data corresponding to a latent image formed on a frame of said photo-sensitive film;

a memory which stores said image data;

a displaying device that displays an image based on said image data; and a display controller that reads said image data corresponding to said frame designated by said frame designating member.

12. The camera according to claim 11, wherein said image data corresponding to said frame designated by said frame designating member is deleted when said frame is illuminated by said illuminating system.

13. The camera according to claim 12, wherein said displaying device has a liquid crystal display and a back light system provided at a back side of said camera, at a position corresponding to an area where said film is exposed to light from an object, an opening being formed on said back side of said camera for allowing said back light system to illuminate said frame, and wherein a shutter system for opening and closing a light path from said back light system to said film is provided between said back light system and said film.

14. The camera according to claim 13, wherein said back light system illuminates said film at lower brightness, and illuminates said liquid crystal display at higher brightness.

15. The camera according to claim 14, wherein said back light system includes a light source and a light guide plate which diffuses and evenly distributes said illumination over a surface of said light guide plate.

16. The camera according to claim 10, further comprising a controller that stores information indicating whether each of said photographing frames is to be deleted, and then controls said illuminate system to illuminates frames to be deleted based on said information.

17. The camera according to claim 16, wherein when said controller controls said illuminating system to illuminate said frames to be deleted, said controller controls said film driving system to rewind said film to position a frame to be deleted at said predetermined position.

* * * * *